Inventor
John W. Payne
By Oswald G. Hayes
Attorney

Patented Aug. 10, 1948

2,446,783

UNITED STATES PATENT OFFICE 2,446,783

APPARATUS FOR FORMING GEL INTO BEADS

John W. Payne, Woodbury, N. J., assignor to Socony-Vacuum Oil Company, Incorporated, a corporation of New York Application August 18, 1944, Serial No. 550,013

5 Claims. (Cl. 252—359)

This application relates to apparatus for preparing beads of gel by gelation of gelable hydrosols in water-immiscible media. More specifically, the invention relates to an improvement over the apparatus disclosed in copending application Serial No. 477,168, filed February 25, 1943, by John W. Payne, Edmund L. Sargent and Henry G. Daley.

The apparatus is adapted to the formation of spherical particles from any hydrogel which may be caused to assume the firm resilient gel state while in a water-immiscible liquid. A typical example is the formation of bead catalyst for catalytic cracking by injection of a silica-alumina hydrosol into a body of oil, the depth of the oil and the gelation time of the sol being so correlated that gelation will occur while the sol is in the form of globules in the body of oil.

Another typical example, embodying a different type of gelation procedure is the formation of pearl glue by injecting a hot glue hydrosol into a body of oil maintained at a temperature below the gelation temperature of the sol. The invention is primarily concerned with means for injecting a large quantity of sol into the oil body in such a manner as to cause the sol to break up into globules of the desired size.

It will be readily apparent that the discharge of a large stream of the sol into the oil body will cause formation of globules of widely varying size. It is accordingly an object of this invention to introduce a large number of streams of the desired size by breaking a single large stream into a plurality of small streams.

As a further object, the invention contemplates introducing the plurality of small streams in such a manner as to minimize agitation at the point of sol introduction, thus substantially avoiding emulsification of oil and sol with resultant detriment to the final product.

Figure 1:
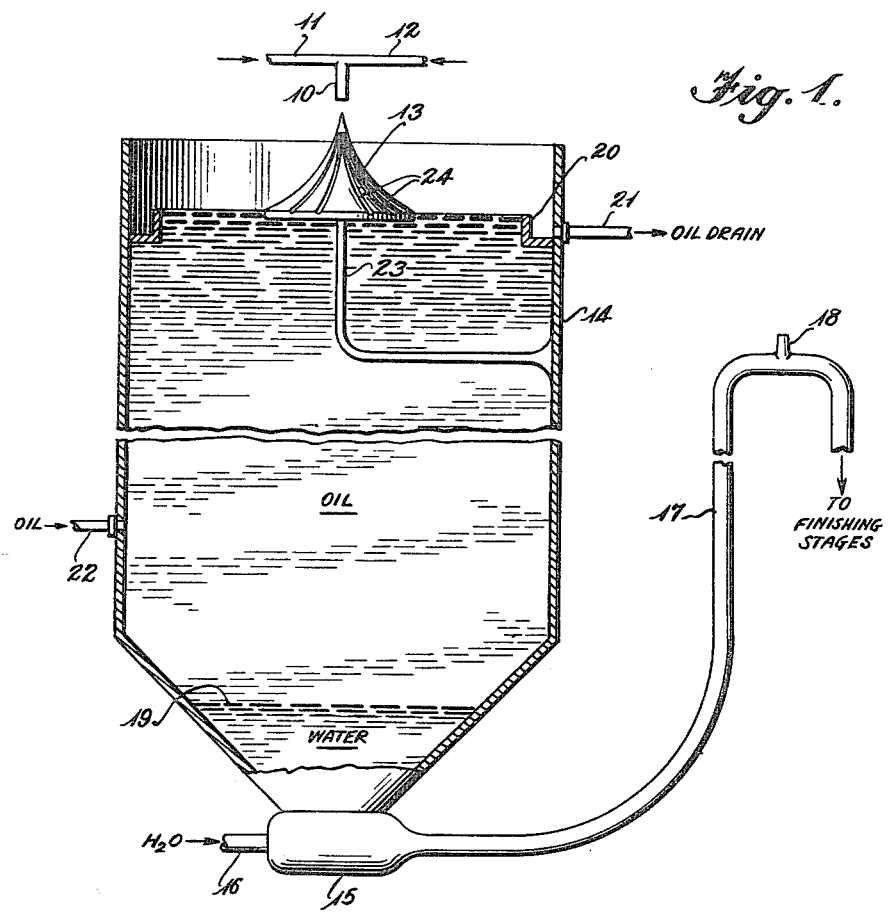
Figure 2:
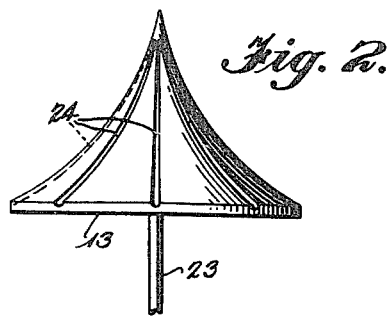

Further objects and advantages of the invention will be apparent from the discussion below of a specific, preferred embodiment illustrated in the annexed drawings wherein:

Figure 1 is an elevation in partial section of apparatus for forming gel beads; and Figure 2 is a detailed view of the divider shown in Figure 1.

Taking the formation of silica-alumina gel bead catalyst as a typical example, a suitable sol is prepared in a mixing nozzle 10 from reactant solutions introduced through lines 11 and 12, from a suitable metering source (not shown). The sol, which may advantageously have a gelation time of 3–6 seconds, is discharged onto the apex of a divider 13 whereupon it is broken up into a plurality of small streams, each of which is separately introduced to a body of oil in an open vessel 14.

The depth of the body of oil in vessel 14 is adjusted in view of the gelation time, viscosity of the oil, and relative density of the sol and oil, to insure that gelation shall occur before the globules of sol leaving divider 13 reach the bottom of vessel 14. The globules of firm gel formed in the body of oil are passed from the bottom of vessel 14 into an injection device 15 where they are picked up by a stream of water introduced by pipe 16 and discharged from the forming apparatus by pipe 17 having a vent 18 to prevent siphoning. Ordinarily, a small amount of water is maintained in the bottom of vessel 14 forming an interface at 19 with the body of oil. The upper surface of the oil body is maintained at a desired level by an annular trough 20 at the top of the vessel 14. Excess oil is withdrawn from the trough through outlet 21 while a supply of oil is continuously introduced at a small rate through pipe 22 to insure maintenance of the desired oil level.

Turning now to Figure 2, it will be seen that the divider itself is of generally conical shape disposed with the apex upward as by supporting on bracket 23. The surface of the divider is curved in the manner shown to provide a steep pitch at the apex while the surface of the divider near the base approaches the horizontal. In the specific example shown, the curvature is a segment of a circle, but any other desired curvature may be used which gives a steep incline at the apex and gentle slope near the base.

The surface of the divider is provided with a plurality of grooves 24, starting at a point of steep incline near the apex of the divider and continuing to the base of the divider. Sol, flowing onto the apex, tends to flow rapidly in a thin film rather evenly distributed about the apex. This thin film is broken into a large number of small streams upon reaching the upper ends of the grooves and flows down the surface of the divider as a large number of small streams. Due to the gradually changing pitch of the divider surface, these streams flow smoothly, and at the bottom of the divider are introduced at a reduced velocity to the body of oil. Although the drawings show a relatively few grooves down the surface of the divider, it is to be understood that this is solely for the purpose of avoiding undue complexity in the drawings.

Dividers actually in commercial use at the present time have an over-all height of 8.75 inches from base to apex, a diameter of 10 inches at the base, and are provided with 60 grooves down the surface. In other respects, the divider illustrated is an accurate representation of that now in commercial use. In commercial installations, the divider has been supported from a frame resting on the top edge of the vessel 14, but the simpler bracket support is illustrated herein to avoid unnecessary complication of the drawings.

It has been found that while the oil level may vary slightly in operation, it should be maintained at a fairly definite level for best results. In order to avoid agitation to the greatest possible extent, the oil level should cover the bottom of the grooves 24 at the base of the divider, but should not be substantially above the rims which define each side of each groove at the base.

In order to avoid gelation of the sol on the divider as much as possible, the divider should be formed of a substance which is not wetted by water or should be coated with a water-repellent material. Good results have been obtained using dividers which are formed of wax such as cerese wax. Alternatively, the divider may be cast or cut from some such material as plaster of Paris and be given a thin coating of a water-repellent substance. Waxes are also suitable for coating the surfaces of dividers formed of a substance which is wetted by water and we have also found that water repellent paints are well adapted to this purpose. For example, a resin paint composed of a volatile solvent and a synthetic resin dissolved therein which forms smooth coatings not wetted by water painted on a sized plaster of Paris base yields very good results.

I claim:

1. In apparatus for forming spherical particles of hydrogel by introducing streams of an inherently gelable hydrosol into a body of a water immiscible liquid; an open vessel adapted to contain a body of liquid, a generally conical divider rigidly fixed in position in the upper part of said vessel with the apex directed upward, the surface of said divider being longitudinally curved inwardly toward the axis of said divider whereby the pitch of said surface is steep at the apex and changes gradually to approach the horizontal at the base, the surface of said divider being formed with a plurality of grooves each following a substantially direct path along said surface from a point of steep pitch adjacent the apex to the edge of the base of said divider, supply means to flow a liquid to the apex of said divider and control means to maintain the level of liquid in said vessel at a point covering the bottoms but not substantially above the rims of said grooves at the termination of said grooves on the base of said divider, whereby the liquid flowed onto the apex of said divider from said supply means will be uniformly split into a plurality of streams at a region of thin film flow at the top of the divider and each of said streams will be introduced to said body of liquid at reduced velocity thus reducing agitation at the points of stream introduction.

2. Apparatus as defined in claim 1 wherein said surface of said divider is formed of a water repellent substance.

3. Apparatus as defined in claim 1 wherein said divider is formed of wax.

4. Apparatus as defined in claim 1 wherein the said surface of said divider is coated with a water repellent substance.

5. Apparatus as defined in claim 1 wherein the said surface of said divider is coated with wax.

JOHN W. PAYNE.

REFERENCES CITED

The following references are of record in the file of this patent:

UNITED STATES PATENTS

| Number | Name | Date |
|---|---|---|
| 1,092,538 | Rauch | Apr. 7, 1914 |
| 1,303,102 | Monrath | May 6, 1919 |
| 2,185,031 | MacLaren | Dec. 26, 1939 |
| 2,352,865 | Smith | July 4, 1944 |
| 2,384,455 | Daley et al. | Sept. 11, 1945 |

FOREIGN PATENTS

| Number | Country | Date |
|---|---|---|
| 581,826 | Germany | Apr. 24, 1930 |